(12) United States Patent
Heinen et al.

(10) Patent No.: US 11,718,483 B2
(45) Date of Patent: Aug. 8, 2023

(54) CONVEYOR ARRANGEMENT WITH SENSORS WITH BUS DATA ENCODING

(71) Applicant: Interroll Holding AG, Sant' Antonino (CH)

(72) Inventors: Daniel Heinen, Hückelhoven (DE); Herbert Henze, Hückelhoven (DE); Claus Blödorn, Hückelhoven (DE); Wolfgang Puntigam, Hückelhoven (DE)

(73) Assignee: Interroll Holding AG, Sant' Antonino (CH)

( * ) Notice: Subject to any disclaimer, the term of this patent is extended or adjusted under 35 U.S.C. 154(b) by 247 days.

(21) Appl. No.: 17/312,015

(22) PCT Filed: Dec. 19, 2019

(86) PCT No.: PCT/EP2019/086247
§ 371 (c)(1),
(2) Date: Jun. 9, 2021

(87) PCT Pub. No.: WO2020/127691
PCT Pub. Date: Jun. 25, 2020

(65) Prior Publication Data
US 2021/0371207 A1    Dec. 2, 2021

(30) Foreign Application Priority Data
Dec. 21, 2018 (DE) .......................... 102018133482.6

(51) Int. Cl.
*B65G 43/08* (2006.01)
*B65G 13/06* (2006.01)
*G05B 19/4155* (2006.01)
*H04L 12/40* (2006.01)
*H04L 67/12* (2022.01)

(52) U.S. Cl.
CPC ............. *B65G 43/08* (2013.01); *B65G 13/06* (2013.01); *G05B 19/4155* (2013.01);
(Continued)

(58) Field of Classification Search
CPC ................ B65G 43/08; B65G 13/06; B65G 2203/0233; B65G 2203/0266;
(Continued)

(56) References Cited

U.S. PATENT DOCUMENTS

| 6,898,483 B2 * | 5/2005 | Wielebski | ............. B65G 47/31 |
| | | | 700/229 |
| 10,185,624 B2 * | 1/2019 | Akutsu | .................... G06F 3/067 |

(Continued)

FOREIGN PATENT DOCUMENTS

| CN | 113329960 A | * | 8/2021 | ............. B65G 13/06 |
| DE | 102005046763 A1 | | 4/2007 | |

(Continued)

OTHER PUBLICATIONS

WO 2012/175193 AI to Mathi et al. (Year: 2012).*
(Continued)

*Primary Examiner* — Gene O Crawford
*Assistant Examiner* — Lester Rushin, III
(74) *Attorney, Agent, or Firm* — Michael Soderman

(57) ABSTRACT

The invention relates to a conveyor arrangement, comprising a motor-operated conveyor roller, comprising a roller body which is mounted so as to be rotatable about a roller axis, a drive unit which is arranged within the roller body and is mechanically coupled between the roller body and an axle element and is designed to generate a torque between the axle element and the roller body, and a control data interface which is connected in a signal-transmitting fashion to the drive unit. The invention is characterized by an electronic addressing model which can be coupled in a signal-transmitting fashion to the sensor and to the bus line and is designed to encode a sensor signal, which is generated by the sensor and received in the addressing module, to form a bus-encoded sensor data block which comprises a digital (Continued)

sensor signal data block which characterises the sensor signal and a sensor address data block, and to transmit the bus-encoded sensor data block into the bus line.

15 Claims, 5 Drawing Sheets

(52) U.S. Cl.
CPC .......... *H04L 12/40032* (2013.01); *B65G 2203/0233* (2013.01); *B65G 2203/0266* (2013.01); *G05B 2219/45054* (2013.01); *H04L 67/12* (2013.01); *H04L 2012/4026* (2013.01)

(58) Field of Classification Search
CPC ...... G05B 19/4155; B05B 2219/45054; H04L 67/12; H04L 2012/4026; H04L 12/40032
See application file for complete search history.

(56) References Cited

U.S. PATENT DOCUMENTS

| | | | | |
|---|---|---|---|---|
| 11,018,558 B2* | 5/2021 | Hamacher | .............. | H02K 11/20 |
| 11,420,825 B2* | 8/2022 | Hampe | .................. | B65G 43/08 |
| 2003/0168316 A1 | 9/2003 | Knopple et al. | | |

FOREIGN PATENT DOCUMENTS

| | | |
|---|---|---|
| DE | 102016120415 A1 | 4/2018 |
| EP | 2221695 A1 | 8/2010 |
| JP | 2002012315 A | 1/2002 |
| JP | 2002046849 A | 2/2002 |
| JP | 3123044 U | 7/2006 |
| JP | 2009505921 A | 2/2009 |
| JP | 2013142699 A | 7/2013 |
| WO | 2012175193 A1 | 12/2012 |
| WO | 2018024917 A2 | 2/2018 |

OTHER PUBLICATIONS

Anonymous: "Speicherprogrammierbare Steuerung—Wikipedia", May 31, 2017, XP055401504, found in the Internet: URL:https://de.wikipedia.org/w/index.php?title=Speicherprogrammierbare_Steuerung&oldid=165967031#SPS-Zust.C3.A4nde [found on Aug. 28, 2017] Chapter "Funktion"; pp. 2-3.

Anonymous: "Feldbus—Wikipedia—Version vom Jul. 21, 2018" Jul. 21, 2018, XP055676138, found in the Internet: URL:https://de.wikipedia.org/w/index.php?title=Feldbus&oldid=179337515 [found on Mar. 12, 2020] p. 1.

* cited by examiner

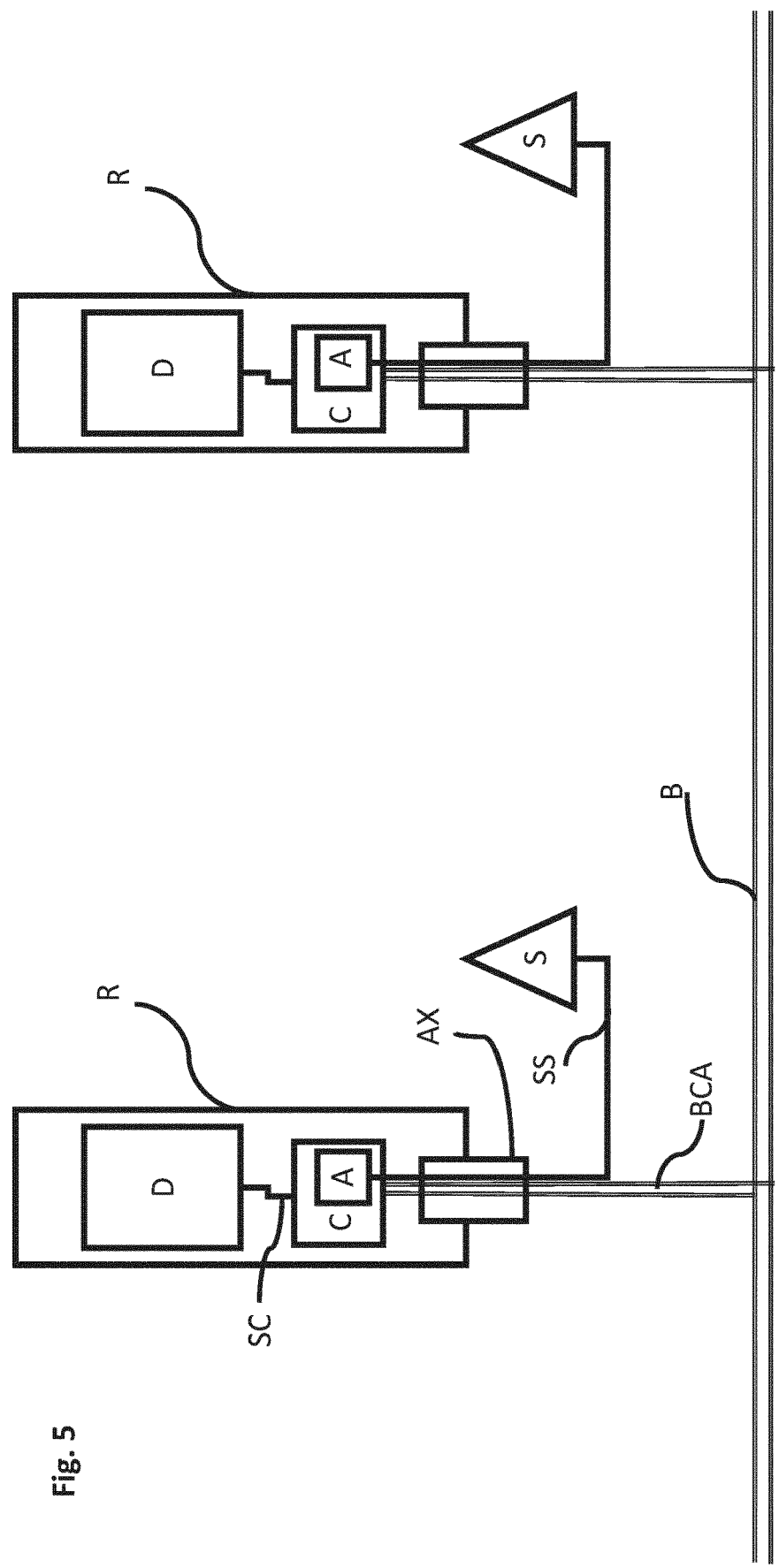

CONVEYOR ARRANGEMENT WITH SENSORS WITH BUS DATA ENCODING

CROSS REFERENCE TO RELATED APPLICATIONS

This application is the U.S. national stage of International Application No. PCT/EP2019/086247, filed on 2019 Dec. 19. The international application claims the priority of DE 102018133482.6 filed on 2018 Dec. 21; all applications are incorporated by reference herein in their entirety.

BACKGROUND

The invention relates to a conveyor arrangement, a motor-operated conveyor roller and a method for operating such a motor-operated conveyor roller for conveying items.

Conveyor arrangements are used to convey conveyed items along a conveyor section. Apparatuses for feeding out, feeding in, raising or lowering and for temporarily storing the items may be integrated in the conveyor arrangement in this case. One or more motor-operated conveyor rollers are used in a conveyor arrangement. Often, multiple conveyor arrangements are installed in a conveyor apparatus. The conveyor apparatus is frequently constructed from multiple conveyor zones that carry an item to be conveyed, the conveyed material, successively along a conveyor section. Each conveyor zone in this instance has at least one motor-operated conveyor roller and, as a general rule, further conveyor rollers. A conveyor arrangement can form such a conveyor zone as part of the conveyor section. This design allows multiple items to be conveyed in the conveyor apparatus simultaneously and contact between individual conveyed materials to be avoided by virtue of the motor-operated conveyor rollers of the individual conveyor zones being actuated accordingly. This realizes so-called zero-pressure accumulation conveyance, which is sought in many applications today, in order to ensure a high level of safety against damage to the conveyed material at high conveyance density and efficiency.

It is known practice, for example, to actuate a motor-operated conveyor roller with zero-pressure accumulation using single-position removal. In this mode of operation, the conveyor roller is actuated to convey a conveyed material in its conveyor zone only if the adjacent conveyor zone that is downstream in the direction of conveyance is free, that is to say is not occupied by another conveyed material. Another zero-pressure accumulation mode is the so-called block removal mode. In the block removal mode, all motor-operated conveyor rollers along adjacent conveyor zones are actuated simultaneously, as a result of which conveyance with no contact is also possible in the case of adjacent conveyor zones containing conveyed materials, since the conveyor zone into which a conveyed material is conveyed simultaneously conveys out the conveyed material that was previously in this conveyor zone.

Zero-pressure accumulation conveyance can be used to reliably prevent damage to the items even though they are conveyed in brief succession in a row along the conveyor section. The problem in this case is both that parameters relevant to conveyance by the conveyor arrangement can change over the course of operation and that such influencing parameters are variable for the conveyed item. As such, for example the coefficient of friction between the conveyor roller and the conveyed item can change as a result of wear, soiling and different material characteristics of the underside of the item, resulting in more or less slippage. In order to prevent damage to the items that could arise, particularly if multiple items are jammed against one another, as a result of action of the summed conveying forces on the frontmost item, it is therefore known practice to monitor the position of the front and/or rear ends of the conveyed items.

A critical aspect of this monitoring is sensors arranged at suitable positions, and it is previously known practice to control a motor-operated conveyor roller of such conveyor arrangements on the basis of a sensor signal from a sensor arranged above the conveyor roller. This is normally accomplished by virtue of light barriers being arranged along the conveyor section, which are mounted at the side of the conveyor section on a frame in which the conveyor rollers are rotatably mounted. In the prior art, there is provision for one sensor per conveyor zone. A sensor signal from such a sensor is taken as a basis for actuating the motor-operated conveyor roller of the conveyor zone. The sensor signal, or the value therefrom, is dependent on whether and when the sensor detects or senses a conveyed material.

In order to use a sensor signal from such a sensor for controlling a motor-operated conveyor roller, appropriate wired data transmissions from the sensor to a central control unit and from the central control unit to the motor-operated conveyor roller are set up. It is furthermore known practice to transmit the sensor signal of the sensor to a local instance of multiple control units arranged along the conveyor section and in turn to connect this control unit to the drive unit in order to actuate the drive unit. These local control systems arranged along the conveyor section are coupled to one another for the purpose of signal transmission.

A disadvantage of this prior art is firstly the considerable wiring complexity that accompanies it. Furthermore, such sensors arranged along the conveyor section and the corresponding wiring are exposed to environmental influences that can completely prevent, disrupt or at least limit the detection of the conveyed material to be conveyed. In particular, the sensors and also the wiring can be damaged, for example during assembly, maintenance or servicing work. Such disruptions can firstly lead to a conveyor apparatus coming to a complete standstill, which results in significant costs and delays in the sequence of events particularly in logistics centres or postal distribution centres. Secondly, these disruptions can cause cumulated back pressure in the conveyor section, resulting in damage to the conveyed material.

A problem with conveyor installations is moreover also that different types of sensors are frequently used in order to detect conveying states within the conveyor installation. This arises in particular in the case of conveyor installations that can perform variable conveying functions, for example feeding-in, feeding-out, raising or lowering to different levels, temporary storage and the like. Both in conveyor installations that are based on a central controller and in conveyor installations that are designed with local controllers, the connection of such sensors and the processing of the signals therefrom are a particular additional challenge. If incorrect connections are made here during assembly, repair or the like or if the signal processing of the sensors takes place or is programmed incorrectly, it is likewise possible for conveying situations to arise in which the conveyed material is damaged. Besides damage to conveyed material, however, the disadvantage can also arise that assembly errors or programming errors can mean that the conveyor installation is not operated at optimum conveying capacity, for example because intervals between the conveyed goods are set that are too great or because conveyor speeds are set that are too low.

SUMMARY

The invention is based on the object of providing a conveyor arrangement that achieves the sensor-based prerequisites for firstly safe, damage-free conveyance of conveyed material and secondly allows the conveying capacity of the conveyor installation to be utilized to a high degree.

This object is achieved according to the invention by a conveyor arrangement, comprising a motor-operated conveyor roller, comprising: a roller body rotatably mounted about a roller axle, a drive unit, arranged inside the roller body, that is mechanically coupled between the roller body and an axle element and is designed to generate a torque between the axle element and the roller body, a control data interface connected to the drive unit for signal transmission purposes, a control unit, comprising a control data bus interface, which is designed to be connected to a data bus line, wherein the control unit is signal-connected to the drive unit and is designed to receive bus-encoded data signals via the control data bus interface, to generate a control signal on the basis of the received data signals and to actuate the drive unit with a characteristic predetermined by the control signal by virtue of the control signal being transmitted to the drive unit, and a sensor for detecting a conveying state, wherein the sensor is arranged outside the roller body. According to the invention, the conveyor arrangement has provision for an electronic addressing module that is couplable to the sensor and to the bus line for signal transmission purposes and is designed to encode a sensor signal generated by the sensor and received in the addressing module to form a bus-encoded sensor data block that comprises a digital digital-sensor-signal data block, characterizing the sensor signal, and a sensor address data block, and to transmit the bus-encoded sensor data block to the bus line.

DETAILED DESCRIPTION

The mechanical design of the conveyor roller causes a roller body to be rotatably mounted about a roller axle, which can be in the form of a virtual axle. The roller body is driven by means of a drive unit that generates a torque about this roller axle. The drive unit is arranged inside the roller body and is supported, with reference to the torque about the roller axle, on an axle element such as for example a mounting shaft for mounting the conveyor roller in a stand. The axle element is typically an axle journal or mounting flange or the like that projects from the roller body on one side, but can also be formed by two axle journals or mounting flanges arranged at opposite ends of the roller body.

The conveyor arrangement according to the invention likewise resorts to a sensor that detects a state within the conveyor arrangement. This sensor can be a sensor from a selection of different sensor types, for example the sensor can be a light barrier sensor, a proximity sensor, a mechanical tactile sensor, a limit switch, a position sensor or a force sensor for weight measurement. A sensor within the context of the invention can also be understood to mean the field of image-capturing apparatuses that obtain sensory information for example by scanning barcodes, image capture with image evaluation and the like.

According to the invention, there is provision for an electronic addressing module for the sensor. This electronic addressing module is designed firstly to receive the sensor signal. In the simplest case, the addressing module can therefore receive an on/off signal from a light barrier, but also complex image signal information or scanned analogue or digital information in the aforementioned cases of more intelligent sensors. In general, the signal transmitted from the sensor to the addressing module can be an analogue or digital signal. The addressing module can be designed to process both analogue and digital signals. According to the invention, however, embodiments in which the addressing module is designed only for an analogue signal or only for a digital signal from the sensor are also possible.

The sensor signal is processed inside the electronic addressing module with the aim of providing the sensor information provided by the sensor in a bus-encoded data network. For this purpose, the sensor signal is firstly converted into a digital-sensor-signal data block, this being necessary for analogue signals, but also being able to be implemented for the purpose of formatting digital signals in a specific data format. In the case of analogue sensor signals, this can thus involve an analogue-to-digital conversion. In particular, the sensor signal is converted into a digital signal such that it can be read according to a specific standard, a specific data processing system or the like and it allows receivers within the bus-encoded data processing system to ascertain the sensor signal, be it analogue or digital, from the digital-sensor-signal data block again, to evaluate said sensor signal and to use it for control processes.

Additionally, the electronic addressing module is designed to assign a sensor address data block to the sensor signal. Such a sensor signal address data block is likewise a digitally encoded data block containing information about the origin of the data. On the basis of the sensor address data block, it is thus possible for any receiver within the bus-encoded data processing system to establish what origin the sensor signals encoded in the digital-sensor-signal data block have. It can firstly include an identification of a specific position as installation location of the sensor, an identification of the sensor as distinctive identification coding, an identification of the sensor type. The sensor address data block can additionally have digital information about the sensor type, that is to say for example can make the design of the sensor identifiable. The sensor address data block can also contain information about the or a group of receivers for which the digital-sensor-signal data block is intended. Additionally, the sensor address data block can contain time information indicating when the sensor signals described in the digital-sensor-signal data block were ascertained or were transmitted to the electronic addressing module. In this way, the sensor address data block renders the sensor signal uniquely identifiable according to its origin and the time of creation, that is to say that said sensor signal is practically provided with a location and time stamp. This allows any receiver connected to the bus line to process the sensor signals of the sensor intelligently on the basis of the sensor data block.

The digital-sensor-signal data block and the sensor address data block are combined to form a bus-encoded sensor data block, for which the electronic addressing module is likewise designed. Additionally, the electronic addressing module is designed to then transmit the bus-encoded sensor data block to the bus line. This transmission process consistently takes place in a bus protocol according to which the electronic addressing module needs to operate and for which it is designed as appropriate. As such, a sensor data block is not necessarily transmitted to the bus line in real time at that time at which the sensor signal was generated by the sensor, that is to say that the applicable conveying state was detected by the sensor and the sensor signal was accordingly transmitted to the electronic addressing module. Instead, the sensor data block can also be transmitted to the bus line with a time delay, this time delay being longer than the short time delay that occurs inside the electronic addressing module as a result of the pure data processing. This time delay can in particular be caused by the circumstance that it is always possible to transmit at specific program times in the bus line; these program times may be specifically assigned to the individual sensors or addressing modules, or the individual subscribers transmitting to the bus line, such as the addressing module, are designed to transmit data blocks to the bus line only if no other subscriber is transmitting to the bus line. The addressing module is therefore also designed to transmit and receive on the basis of specific communication rules within the bus line system that contains the bus line to which it is supposed to transmit and to which it is connected, and to implement its own transmission and reception behaviour in the bus line in accordance with these communication rules.

Preferably, the addressing module is also designed to receive and process bus-encoded data from the bus line, in order to actuate the sensor therefrom. This function is relevant to sensors that can detect different ambient values or that are supposed to be actuated over time, in order to generate sensor signal generation defined according to the type of ambient value detection or over time. The addressing module is therefore preferably also accordingly designed to actuate analogue sensors or sensors that cannot be actuated in bus-encoded fashion on the basis of the received bus-encoded data as appropriate.

According to a first preferred embodiment, there is provision for the electronic addressing module to be arranged outside the roller body and to have an addressing module data interface having an addressing module sensor data interface for connecting the sensor and an addressing module bus data interface for connecting the bus line, wherein the electronic addressing module is designed to receive the sensor signal generated by the sensor via the sensor data interface and to transmit the bus-encoded sensor data block to the bus line via the addressing module bus data interface. According to this embodiment, the electronic addressing module is in the form of a separate unit outside the roller body of the conveyor roller in the conveyor arrangement. The electronic addressing module can be implemented as a separate electronic subassembly, for example. This separate electronic subassembly can be arranged in a separate addressing module housing that has the appropriate interfaces in order to receive the sensor signal and in order to send the sensor data block. The addressing module sensor data interface in this instance may be specifically designed to receive sensor signals from a specific sensor. It may also be designed to receive specific signals from different types of sensors, for example by virtue of multiple different sensor data interfaces being included therein or a universal sensor data interface being formed.

The specific configuration can be in the form of the provision of specific sensor data line connections, such as in the form of specific plug or socket shapes or the like. The addressing module bus data interface can be used to connect a bus line, the bus line type being able to be selected differently in this case. As such, for example one embodiment of the addressing module bus data interface may be implemented using insulation-displacement technology for connecting an ASI bus line. In other configurations, for example a connection method for a Profibus can be used or other standardized bus line types may be connectable. It should be understood that this type and choice of bus standard can be applied for all bus interfaces and bus lines related to the invention.

According to this preferred embodiment, the electronic addressing module functions as a translation unit that is connected between the sensor and the bus line and may be arranged separately at any location in the region of the conveyor arrangement. The electronic addressing module according to this embodiment may for example also be arranged on a conveyor roller as an external attachment, that is to say may be positioned outside the roller body of the conveyor arrangement in the region of an axle journal or the like. The electronic addressing module can also be provided as a subassembly that can be plugged in by means of a plug connection, said subassembly being able to be plugged into control units, conveyor rollers or the like, for example, in order to be fitted. Plugging it in allows an electrical connection to be made that may be part of the addressing module bus data interface or of the addressing module sensor data interface or of both, as a result of which a sensor data line or bus line connected to the control unit or to the conveyor roller is connected to the addressing module thereby and can be used for transmitting sensor signals or the bus-encoded sensor data block.

Further still, it is preferred if the conveyor arrangement is developed by a control module arranged outside the roller body, comprising the control unit and a control module data interface having the control bus data interface for connecting the bus line and a control module drive data interface for coupling to the drive unit for signal transmission purposes, wherein the control unit is arranged inside the control module, is connected to the control module bus data interface and the control module drive data interface for signal transmission purposes and is designed to use the control module bus data interface as a control data bus interface and to transmit the control signal to the drive unit via the control module drive data interface. According to this embodiment, the control unit that actuates the drive unit is arranged outside the roller body in a control module. This control module can be arranged physically inside the conveyor arrangement separately from the conveyor roller itself and can be connected to said conveyor roller via a signal control line, for example. The control module can alternatively also be mounted on the conveyor roller in the region of an axle journal and, by way of this mounting, can also make an appropriate electrical connection for transmitting the control signals. The control module has a control module data interface that firstly allows the connection to the bus line inside the conveyor arrangement and therefore makes it possible for the control unit to receive and process all information sent via the bus line. Additionally, there is provision for a control module drive data interface on the control module, which control module drive data interface allows the connection for signal transmission from the control unit to the drive unit. Both the control module bus data interface and the control module drive data interface can be formed by appropriate sockets or plugs, or a connection using insulation-displacement technology or by individual stranded connection or the like can be implemented on the interface.

It is particularly preferred if the control module data interface comprises a sensor data interface and the electronic addressing module is arranged inside the control module and is designed to receive the sensor signal generated by the sensor via the sensor data interface and to transmit the digital-sensor-signal data block to the bus line via the control module bus data interface. According to this embodiment, the electronic addressing module is arranged inside the control module. In particular, the electronic addressing module may be implemented integrally with the control unit inside this control module, that is to say may be produced as an electronic circuit together with the control unit. This integration of the addressing module and the control unit in the control module allows a compact design and simple connection within the conveyor arrangement according to the invention. For this purpose, the control module has an additional sensor data interface to which a sensor can be connected for the purpose of transmitting sensor signals to the control module. Inside the control module, this sensor signal can therefore firstly be processed by the addressing module and fed to the bus line. Secondly, the sensor signal can also be processed directly by the control unit, for example in order to generate a control signal therefrom and to transmit said control signal to the drive unit. Alternatively, the control unit can also receive and process the bus-encoded sensor signal generated by the addressing module by receiving and processing the signals received via the bus line from the control module bus data interface, in order to generate control signals for the drive unit therefrom and to send said control signals to said drive unit.

According to a further preferred embodiment, there is provision for the control unit to be arranged in the roller body and to have a sensor data interface for connecting the sensor and to be designed to receive the sensor signal via the sensor data interface. According to this embodiment, the control unit is arranged in the roller body and has an opportunity to connect the sensor by means of a sensor data interface. Fundamentally, this sensor data interface can be the control data bus interface, that is to say that the control data bus interface and the sensor data interface are implemented integrally and the sensor data are received by the control unit via the control data bus interface as bus-encoded sensor data signals. This configuration is advantageous for example if the addressing module is arranged outside the roller body as a separate subassembly and therefore bus-encoded sensor signal data are already present in the bus line. The sensor data interface can also be implemented as an independent interface separately from the control data bus interface of the control unit, however, for example implemented in the manner described above like the addressing module sensor data interface for directly connecting sensors that output analogue or digital sensor signals. The control unit in the roller body implements the logical control steps and control decisions within the roller body. Both a central control unit and a local control unit outside the roller body are no longer necessary in this embodiment and can therefore preferably be dispensed with. The control unit arranged in the roller body uses the sensor data interface and the control data bus interface to receive all the necessary signal data for making a logical control-related decision regarding how the drive unit of the conveyor roller should be actuated. In particular, this control decision comprises the binary control command to connect or disconnect the drive unit, but furthermore also further control commands relating to acceleration behaviour, braking behaviour, maximum speed of the drive unit. Additionally, the control unit can take on monitoring functions of the drive unit and be designed for this purpose, such as for example motor current measurements, temperature detection, recording of operating period of the drive unit and maximum loading parameters, storage of such values and the opportunity to be able to read these values from the control unit in order to transmit them to a receiving unit outside the roller body. The control unit can additionally comprise commutation electronics in order to control brushless electric motors. The arrangement of the control unit in the roller body allows a direct signalling connection and communication between two adjacent conveyor rollers in the conveyor arrangement. In particular, for example the bus line can be used to transmit data from a control data bus interface of one conveyor roller to other control data bus interfaces of a multiplicity of other conveyor rollers, without this involving a local or central control unit outside the conveyor roller bodies of the two conveyor rollers being interposed or enabled.

It is particularly preferred if the electronic addressing module is arranged in the roller body, and the sensor data interface is connected to the electronic addressing module, wherein the electronic addressing module is preferably designed to transmit the bus-encoded sensor data block via the control data bus interface. According to this embodiment, the bus encoding of the sensor signal likewise takes place inside the roller body by virtue of the electronic addressing module being arranged in the roller body. The electronic addressing module in this instance can in particular be implemented integrally with the control unit. In terms of function, the electronic addressing module can receive sensor signals via the sensor data interface and can encode these sensor signals as bus signals in the manner explained above and can then transmit them to the bus line as a bus-encoded sensor data block via an appropriate connection to the bus line. This connection to the bus line can preferably be formed by the control data bus interface, as a result of which the reception of control-relevant signals from the bus line and the sending of the bus-encoded sensor data block take place via one and the same bus interface. The integral embodiment of the control unit and of the addressing module furthermore allows optionally separate or joint sending of bus data from the sensor roller. As such, a data packet containing data content characterizing the operating state of the drive unit, that is to say for example speed, acceleration, braking behaviour or invariable parameters of the conveyor roller, can be sent from the conveyor roller by the control unit. Additionally, a data packet can be sent that corresponds to the sensor data block explained above and contains the bus-encoded sensor signals, including addressing and possibly timestamps. Alternatively, however, it is also possible for both data packets to be sent as a joint data packet. In that case, for example the sensor and the conveyor roller may have one and the same allocated bus address, which can physically correspond to a conveyor zone, for example. The data packet in that case contains firstly the sensor data block and secondly additional data content characterizing the operating state of the drive unit. As such, all information relevant to adjacent conveyor zones from a conveyor zone can be transmitted from the roller body to the bus line together in a single data packet.

Further still, it is preferred if the sensor is designed to detect a conveyed material conveyed by the conveyor roller and to generate a sensor signal that signals the presence or the absence of a conveyed material in a sensor area monitored by the sensor. According to this embodiment, the sensor is designed to detect conveyed material. For this purpose, the sensor may in particular be a light barrier sensor. This type of sensor detects a state within the conveyor zone that is directly relevant to the control of the drive unit. This direct relevance, in combination with the direct processing of the sensor signal and the bus encoding thereof, is particularly advantageous for fast and reliable data processing. The sensor may fundamentally also be arranged inside the roller body in this instance. As such, for example a supported load on the conveyor roller can be detected by the sensor, for example by virtue of a mechanical stress in the form of a tension or strain on load-bearing components being detected by the sensor; the sensor may be integrated in the roller as a strain gauge, for example. Other sensor forms arranged inside the roller are likewise conceivable, for example electrostatic field detection around the roller body by a sensor of appropriate design. The sensor can also be formed integrally by evaluating operating parameters of the drive unit. As such, for example differentiation of the loading of the drive unit during acceleration, at constant speed or during deceleration can ascertain whether the conveyor roller is conveying a conveyed material or is idling, and this allows the presence of a conveyed material above the conveyor roller to be determined.

Further still, it is preferred if the electronic addressing module is formed on the sensor and has an addressing module bus data interface for connecting the bus line, wherein the electronic addressing module is designed to transmit the digital-sensor-signal data block to the bus line via the addressing module bus data interface. According to this embodiment, the sensor is formed integrally with the addressing module. The sensor is therefore already designed to transmit bus-encoded sensor signals to the bus line, and the sensor is connected directly to the bus line. This embodiment is in particular suitable for new sensors or sensors newly integrated in existing conveyor arrangements, which are already implemented as bus-encoded sensors according to the new equipment standard. According to the invention, it is particularly advantageous in this instance that such integration of new sensors in existing conveyor arrangements can be implemented and the sensors additionally present in the conveyor arrangement can be completely integrated in the bus-encoded signal interchange within the conveyor arrangement through appropriate encoding by means of electronic addressing modules.

According to a further preferred embodiment, there is provision for the sensor to be designed to detect an identity coding assigned to the conveyed material or a conveyor destination assigned to the conveyed material and for the control unit to be designed to take the sensor signal containing the identity coding assigned to the conveyed material or the conveyor destination assigned to the conveyed material as a basis for generating a control signal and to transmit said control signal to an actuator on a divert, crossing or merge conveyor element that controls the actuator and thus brings about conveyance in a direction that can be derived from the identity coding or the conveyor destination and is necessary therefor or preferred. According to this embodiment, the sensor is used to generate a signal that characterizes either the identity of a conveyed material detected by the sensor or a conveyor destination within a conveyor arrangement for a conveyed material detected by the sensor. This can be effected by reading a barcode, an RFID tag or the like arranged on the conveyed material, for example. This sensor signal is processed by the control unit, which, in the case of an identity-characterizing sensor signal, for example, can involve a comparison in a conveying instruction table that records and stores a conveyor destination for each identified conveyed material. The result of this processing is a control signal that is used to control an actuator. The actuator can actuate a lifting or lowering device; it can actuate feed-out conveyor units or feed-in conveyor units or can actuate direction-influencing conveyor elements in another way. The control signal brings about actuation that steers the conveyed material in one particular direction from various directions that take the conveyed material to the conveyor destination.

A further aspect of the invention is a motor-operated conveyor roller for a conveyor arrangement according to one of the embodiments above, comprising a roller body rotatably mounted about a roller axle, a drive unit, arranged inside the roller body, that is mechanically coupled to the roller body and an axle element and is designed to generate a torque between the axle element and the roller body, a control data interface connected to the drive unit for signal transmission purposes, a control unit, comprising a control data bus interface, which is designed to be connected to a data bus line, wherein the control unit is signal-connected to the drive unit and is designed to receive bus-encoded data signals via the control data bus interface, to generate a control signal on the basis of the received data signals and to actuate the drive unit with a characteristic predetermined by the control signal by virtue of the control signal being transmitted to the drive unit, which motor-operated conveyor roller is developed in that the control unit is arranged in the roller body and designed to receive a bus-encoded sensor signal via the control data bus interface.

According to this aspect, the invention is realized in a motor-operated conveyor roller designed for processing bus-encoded sensor signals. The motor-operated conveyor roller can in particular be used in conveyor arrangements as were described above. In this type of conveyor arrangement, the sensor signals are available in the form of bus-encoded sensor signals on account of the encoding that takes place in the addressing module, and can therefore be received by the conveyor roller as corresponding bus-encoded sensor signals.

The motor-operated conveyor roller according to this aspect of the invention can in particular be developed in that the control unit comprises a sensor data interface and an electronic addressing module that is couplable to a sensor and to the bus line via the sensor data interface for signal transmission purposes and is designed to encode a sensor signal received in the addressing module via the sensor data interface to form a bus-encoded sensor data block that comprises a digital digital-sensor-signal data block, characterizing the sensor signal, and a sensor address data block, and to transmit the bus-encoded sensor data block to the bus line. According to this development, the addressing module that performs the bus encoding for the sensor signals is arranged inside the roller body; therefore, the conveyor roller according to this aspect of the invention can firstly receive sensor signals that are not bus-encoded and can accordingly bus-encode these sensor signals, the processing of the sensor signals taking place inside the control unit for the purpose of generating control signals for the drive unit on the basis of these sensor signals by virtue of the non-bus-encoded sensor signals being processed or by virtue of the bus-encoded sensor signals being processed. Additionally, the control unit may be designed to receive bus-encoded sensor data blocks from the bus line and to process them. That includes both bus-encoded sensor data blocks that were encoded and sent by the electronic addressing module contained in the conveyor roller itself, and bus-encoded sensor data blocks that were created by other sensors outside the roller and bus-encoded by electronic addressing modules arranged outside the roller.

The motor-operated conveyor roller can additionally be developed in that the control unit is designed to generate the control signal on the basis of the bus-encoded sensor data block. According to this development, the control unit is designed to use the bus-encoded sensor data block as a basis for generating the control signal. Accordingly, the control by the control unit is effected such that a non-bus-encoded sensor signal received in the conveyor roller is first encoded by the addressing module in the conveyor roller, that is to say inside the roller body of the conveyor roller, in a bus-encoded sensor data block and sent via the bus line. This bus-encoded sensor data block is processed by the control unit, the processing being able to take place after the signal is received from the bus line or by means of direct transmission from the addressing module. On the basis of the content of this bus-encoded sensor data block, the generation of the control signal for actuating the drive unit then takes place inside the roller body.

Finally, a further aspect of the invention is a method for operating a motor-operated conveyor roller for conveying items along multiple conveyor zones of a conveyor section, having the steps of: detecting an item with a sensor in one of the conveyor zones, generating a digital-sensor-signal data block, which describes the detection of the item, and a sensor address data block, which describes the conveyor zone in which the item is detected, merging the digital-sensor-signal data block and the sensor address data block to form a bus-encoded digital-sensor-signal data block, sending the digital-sensor-signal data block via a bus line, receiving the digital-sensor-signal data block in a control unit; generating a control signal on the basis of the digital-sensor-signal data block, and actuating a drive unit in the conveyor roller with the control signal.

The method according to the invention implements the previously explained steps of encoding non-bus-encoded sensor signals into bus-encoded sensor signals. Additionally, the method according to the invention can involve these bus-encoded sensor signals being sent in the previously explained manner. Finally, the processing of the sensor signals or of the bus-encoded sensor data blocks in the previously explained manner is also part of a development of this method. With regard to these method steps, reference is made to the previously provided explanations concerning the appropriately designed substantive forms within the conveyor arrangement, namely to the configuration of the addressing module, the control unit, the motor-operated conveyor roller, any addressing module arranged outside the roller body, any control module arranged outside the roller body with an addressing module possibly contained therein, or an arrangement of the control unit and/or addressing module inside the roller body.

In particular, it is preferred for the method if the control unit receives a sensor signal and encodes the sensor signal into the digital-sensor-signal data block.

Additionally, it is preferred if the control unit is arranged in the roller body and transmits the digital-sensor-signal data block to a bus line via a control data bus interface arranged on the conveyor roller. According to this embodiment, the sensor signal is transmitted to the bus line by the control unit and thus made available to other receivers in the bus line network. This allows intelligent control processes to be realized in a conveyor arrangement by virtue of bus-encoded sensor signals being able to be processed by any receiver, and therefore spatially and temporally predictive control decisions being taken within the conveyor arrangement.

Additionally, it is preferred if the control proceeds such that the sensor is used to detect an identity coding assigned to the conveyed material or a conveyor destination assigned to the conveyed material and that the control unit takes the sensor signal containing the identity coding assigned to the conveyed material or the conveyor destination assigned to the conveyed material as a basis for generating a control signal and transmits said control signal to an actuator on a divert, crossing or merge conveyor element that controls the actuator such that conveyance in a direction that can be derived from the identity coding or the conveyor destination and is necessary therefor or preferred is brought about.

BRIEF DESCRIPTION OF THE DRAWINGS

Preferred embodiments of the invention are described with reference to the accompanying figures, in which:

FIG. 5 shows a fifth embodiment of a conveyor arrangement according to the invention.

DETAILED DESCRIPTION OF THE PREFERRED EMBODIMENTS

Figure 1:
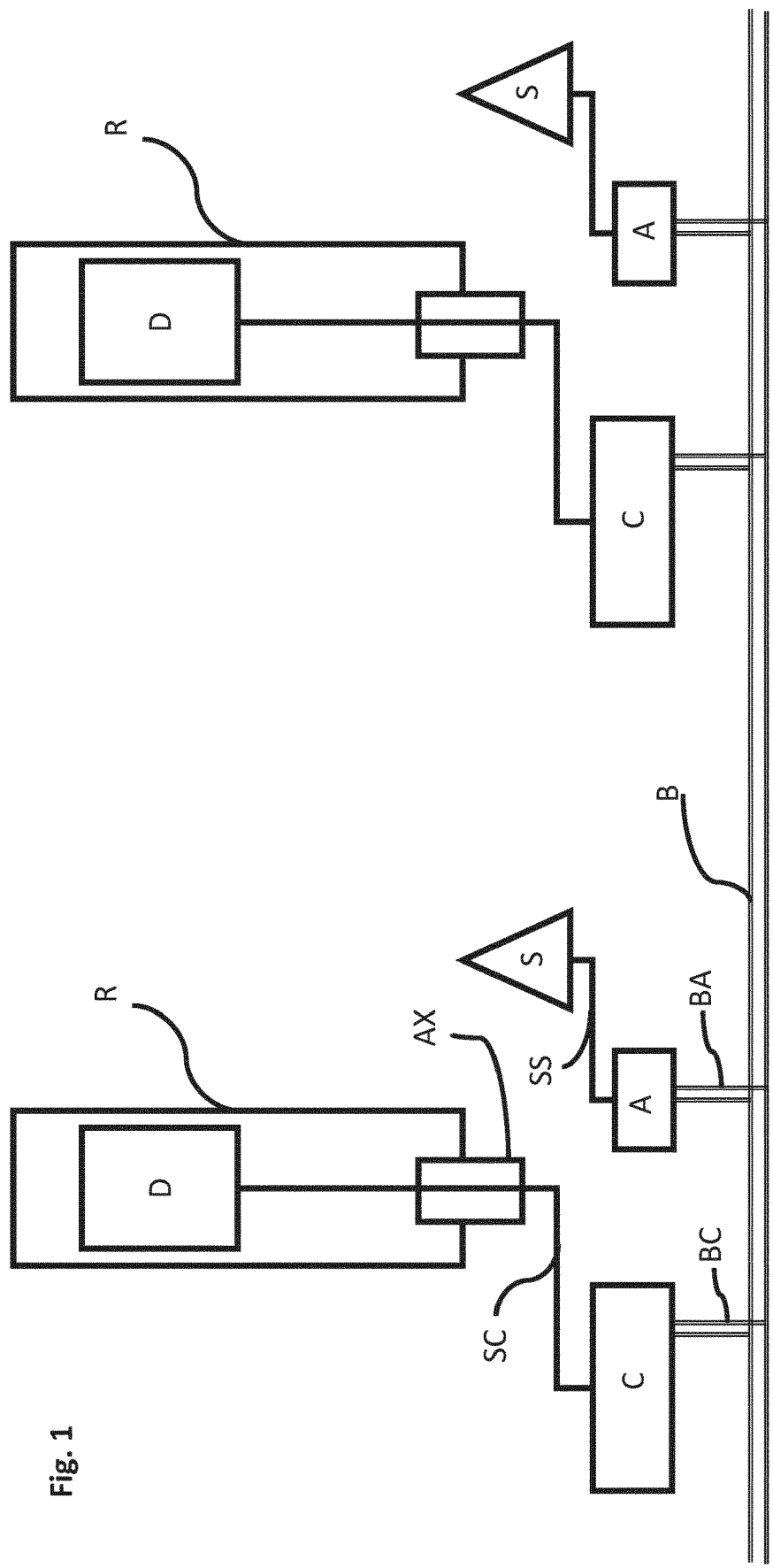
FIG. 1 shows a first embodiment of a conveyor arrangement according to the invention.

Referring first to FIG. 1, a detail from a conveyor arrangement that has multiple conveyor rollers that can be arranged such that they form a conveyor section is shown. Each conveyor roller has a roller body R and is arranged in a corresponding conveyor zone. The depiction shows a detail having two conveyor zones and accordingly two conveyor rollers.

Arranged inside the roller body is a drive unit D that generates a torque between an axle journal AX and the roller body R and consequently sets the roller body rotating with reference to the axle journal AX.

In the embodiment shown in FIG. 1, the drive unit D is actuated via a control line SC. This control line connects the drive unit to a control unit C arranged outside the roller body. The control line SC is therefore routed through the axle journal AX, which is in the form of a hollow axle. It should be understood that a power supply additionally needs to be routed to the drive unit, said power supply likewise being able to be implemented by appropriate power lines routed through the axle journal AX. This power line is not depicted in the figures.

The control unit C is connected to a bus line B by means of a bus connection BC. This bus line B connects the control units of the individual conveyor zones to one another and allows communication among these control units.

There is additionally provision for a sensor S that can detect the presence or absence of a conveyed material in the region of the conveyor roller. This sensor outputs an analogue signal that is transmitted to an addressing module A via a sensor signal line SS. The addressing module is arranged outside the roller body and is arranged separately from the control unit C. In the addressing module, the sensor signal is bus-encoded and fed to the bus line B as a sensor data block via a bus access line BA. Any receiver connected to the bus line B can therefore receive this sensor signal and identify it as coming from a specific sensor in a specific conveyor zone and having been detected at a specific time. The bus access line BA is also used to allow the addressing module A to receive data from the bus line.

Figure 2:
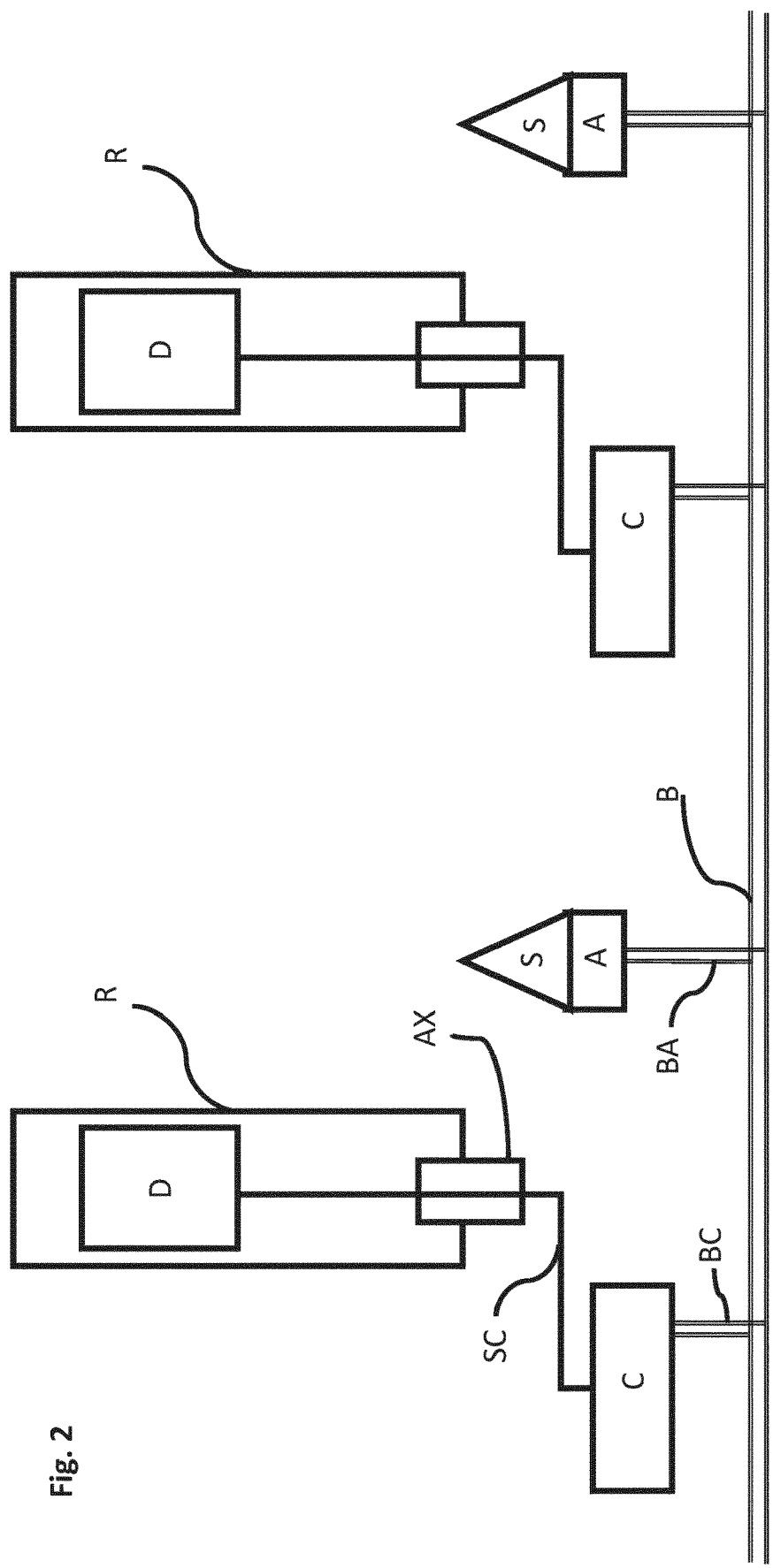
FIG. 2 shows a second embodiment of a conveyor arrangement according to the invention.

FIG. 2 shows a second embodiment, which differs from the first embodiment. The difference in this case is that the sensor S in this embodiment is already implemented as a bus-encoding sensor. The sensor therefore includes an addressing module, which outputs the sensor signals as bus-encoded sensor signals from the sensor. The sensor and the addressing module are implemented integrally in one sensor housing. The sensor housing is therefore connected directly to the bus line via a bus access line BA. The sensor signals supplied in this manner in the form of a bus-encoded sensor data packet can be received and processed by the connected receivers, as per FIG. 1.

Figure 3:
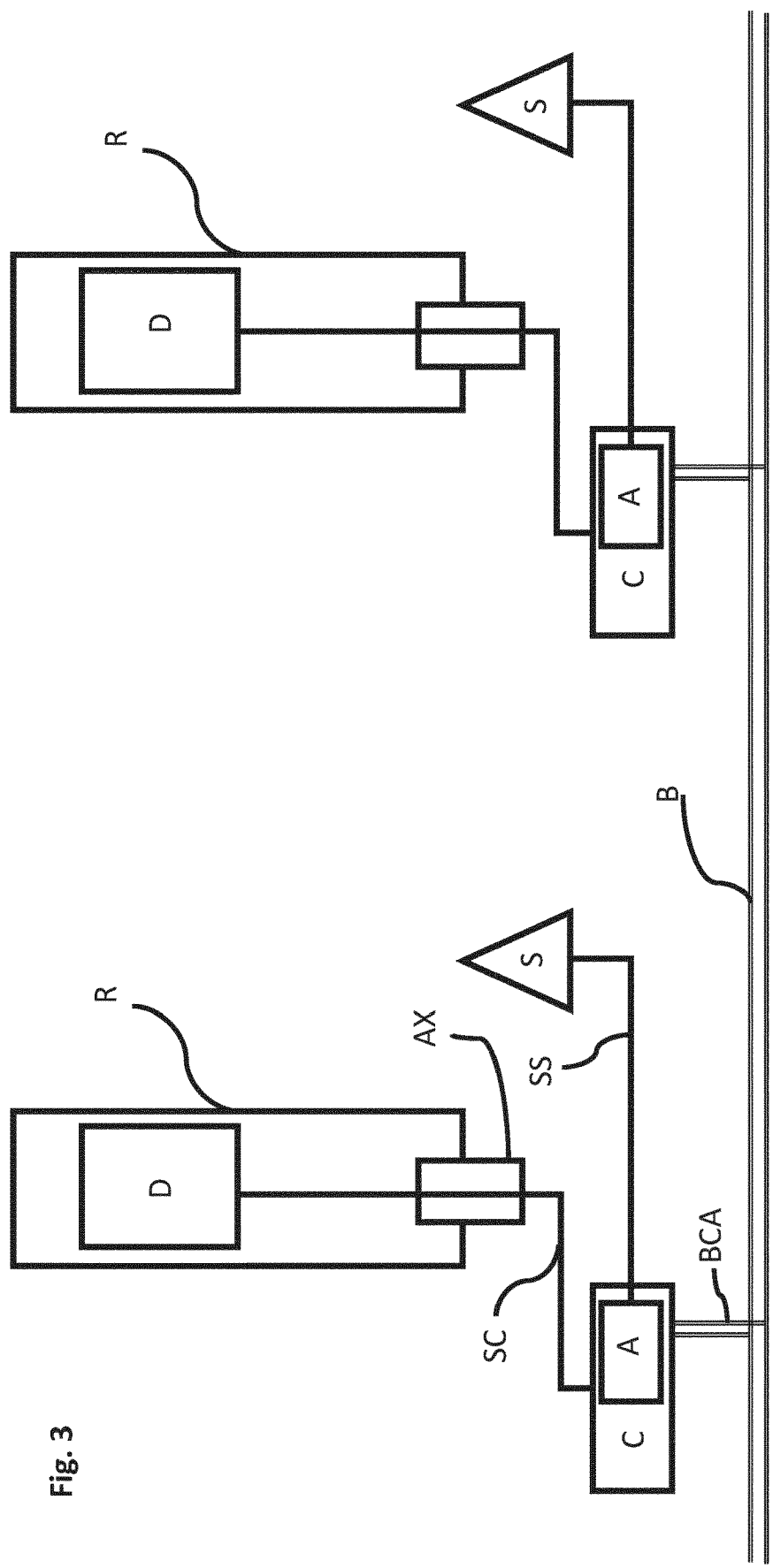
FIG. 3 shows a third embodiment of a conveyor arrangement according to the invention.

FIG. 3 shows a third embodiment of the invention. In this embodiment, the addressing module A is integrated in the control unit C. The sensor S is therefore connected to the control unit C by means of the sensor line SS in order to supply the sensor signal to the addressing module A. The sensor signal supplied in this way can be processed directly inside the control unit C. The sensor signal is fed to the bus line B via a bus access BCA. The bus access BCA is also used to allow the control unit or the addressing module A to receive data from the bus line or to transmit data to the bus line, such as for example operating data for the drive unit D or the conveyor roller.

Figure 4:
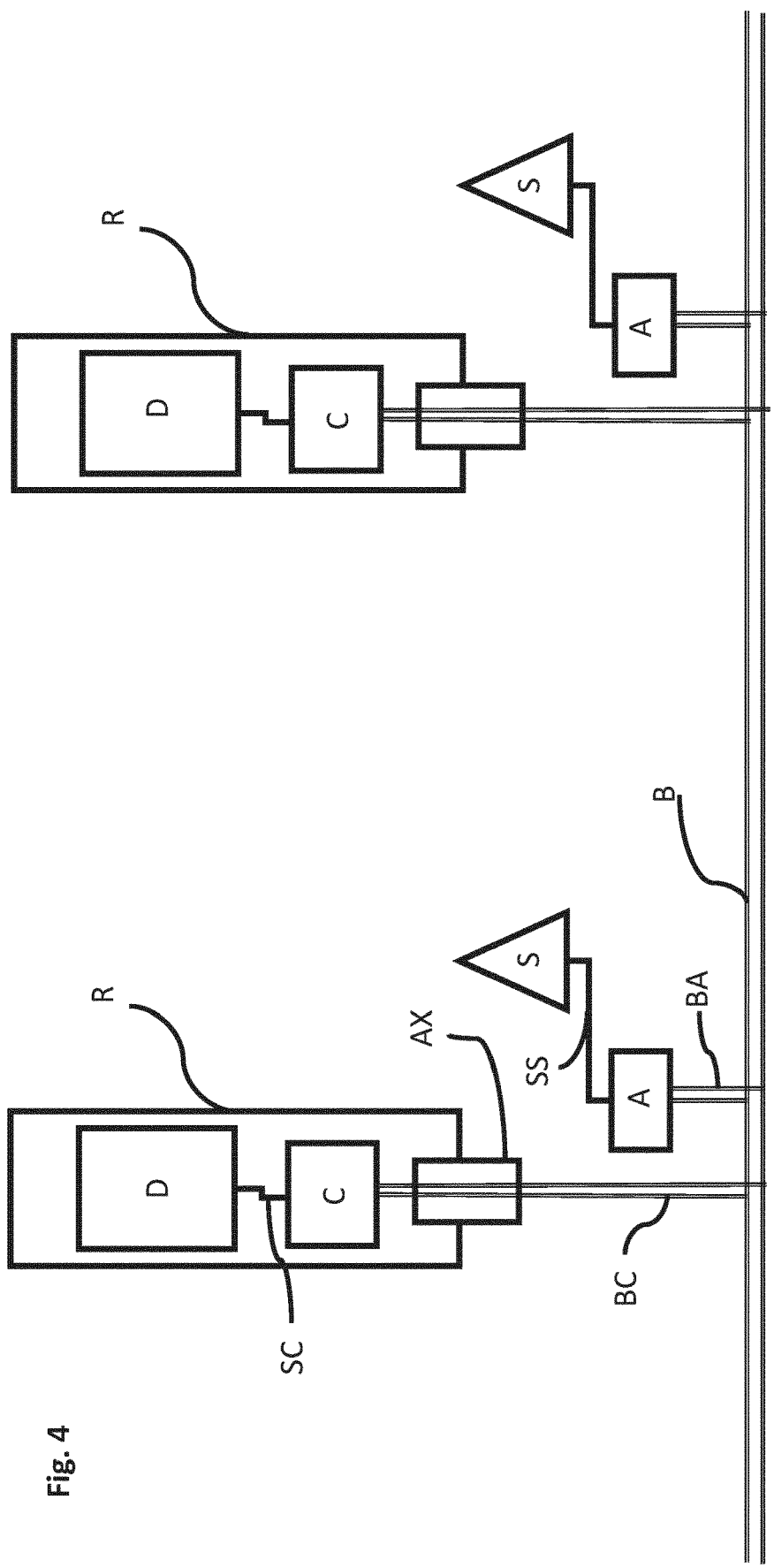
FIG. 4 shows a fourth embodiment of a conveyor arrangement according to the invention.

FIG. 4 shows a fourth embodiment. In this embodiment, the control unit C is integrated in the roller body R. The connecting line BC for the connection between the control unit C and the bus line B therefore extends through the axle journal AX and connects the control unit inside the roller body directly to the bus line. Bus-encoded control signals can therefore be sent directly to the roller body and received by the control unit there.

The sensor S with the addressing module A, the sensor line SS and the access line BA is implemented as in FIG. 1 in this embodiment. Fundamentally, it should be understood that this embodiment can also have provision for an embodiment as per FIG. 2 with the addressing module formed integrally on the sensor.

FIG. 5 shows a fifth embodiment. In this embodiment too, the control unit is integrated in the roller body R, that is to say is arranged inside the roller body R.

The addressing module A is integrated in the control unit C, that is to say is likewise arranged inside the roller body. The sensor signal line SS therefore extends from the sensor through the axle journal AX into the interior of the roller body in order to transmit the sensor signal to the addressing module. Additionally, a bus line BCA extends through the axle journal, said bus line connecting the control unit and the addressing module to the bus line B. In this embodiment, the processing of the applicable signals by the control unit with the integrated addressing module can be implemented in the same way as in the third embodiment. This results in a particularly compact design for the conveyor arrangement with very low wiring complexity.

Fundamentally, it should be understood that the five embodiments shown may, in each particular case, be the basis for a conveyor arrangement that, all in all, is of consistent design according to one of the embodiments. However, the connecting bus line here, which ensures consistent signal transmission in each of the embodiments in each particular case, means that any hybrid forms among the five embodiments can also be realized in a conveyor arrangement. This means that in a conveyor arrangement both a conveyor roller and a sensor having a connection design according to the first embodiment can be connected to a bus line to which a conveyor roller and sensor based on connections according to the second embodiment and a conveyor roller and sensor based on connections according to the third embodiment and/or the fourth embodiment and/or the fifth embodiment can also be connected. In theory, all five embodiments shown can be combined with one another in a single conveyor arrangement and communicate with one another via the bus line such that any conveyor flow controls are thus realizable. This combinability makes the configuration according to the invention particularly versatile and variable in regard to an upgrade of existing conveyor installations, integration of different sensors and connection designs in highly complex conveyor arrangements. In particular, extensions and replacement of faulty components in such conveyor arrangements can also be realized with the embodiment according to the invention.

LIST OF REFERENCE NUMERALS

A addressing module
AX axle journal, axle element
B bus line
BA bus access line
BC bus connection
BCA bus access
C control unit
D drive unit
R roller body
S sensor
SC control line
SS sensor signal line

The invention claimed is:

1. Conveyor arrangement, comprising
a) a motor-operated conveyor roller, comprising:
a roller body rotatably mounted about a roller axle,
a drive unit, arranged inside the roller body, that is mechanically coupled between the roller body and an axle element and is designed to generate a torque between the axle element and the roller body,
a control data interface connected to the drive unit for signal transmission purposes,
b) a control unit, comprising a control data bus interface, which is designed to be connected to a data bus line, wherein the control unit is signal-connected to the drive unit and is designed to receive bus-encoded data signals via the control data bus interface, to generate a control signal on the basis of the received data signals and to actuate the drive unit with a characteristic predetermined by the control signal by virtue of the control signal being transmitted to the drive unit,
c) a sensor for detecting a conveying state, wherein the sensor is arranged outside the roller body,
characterized by
d) an electronic addressing module that is couplable to the sensor and to the bus line for signal transmission purposes and is designed
to encode a sensor signal generated by the sensor and received in the addressing module to form a bus-encoded sensor data block that comprises a digital digital-sensor-signal data block, characterizing the sensor signal, and a sensor address data block, and
to transmit the bus-encoded sensor data block to the bus line
wherein the sensor is designed to detect an identity coding assigned to the conveyed material or a conveyor destination assigned to the conveyed material and in that the control unit is designed to take the sensor signal containing the identity coding assigned to the conveyed material or the conveyor destination assigned to the conveyed material as a basis for generating a control signal and to transmit said control signal to an actuator on a divert, crossing or merge conveyor element that controls the actuator and thus brings about conveyance in a direction that can be derived from the identity coding or the conveyor destination and is necessary therefor or preferred.

2. Conveyor arrangement according to claim 1,
characterized in that the electronic addressing module is arranged outside the roller body and has an addressing module data interface having an addressing module sensor data interface for connecting the sensor and an addressing module bus data interface for connecting the bus line, wherein the electronic addressing module is designed to receive the sensor signal generated by the sensor via the sensor data interface and to transmit the bus-encoded sensor data block to the bus line via the addressing module bus data interface.

3. Conveyor arrangement according to claim 1, characterized by a control module arranged outside the roller body, comprising the control unit and a control module data interface having a control bus data interface and a control module drive data interface for coupling to the drive unit for signal transmission purposes, wherein the control unit is arranged inside the control module, is connected to a control module bus data interface and the control module drive data interface for signal transmission purposes and is designed to use the control module bus data interface as a control data bus interface and to transmit the control signal to the drive unit via the control module drive data interface.

4. Conveyor arrangement according to preceding claim 3, characterized in that the control module data interface comprises a sensor data interface and the electronic addressing module is arranged inside the control module and is designed to receive the sensor signal generated by the sensor via the sensor data interface and to transmit the digital-sensor-signal data block to the bus line via the control module bus data interface.

5. Conveyor arrangement according to claim 1, characterized in that the control unit is arranged in the roller body and has a sensor data interface for connecting the sensor and is designed to receive the sensor signal via the sensor data interface.

6. Conveyor arrangement according to claim 5, characterized in that the electronic addressing module is arranged in the roller body, and the sensor data interface is connected to the electronic addressing module, wherein the electronic addressing module is preferably designed to transmit the bus-encoded sensor data block via the control data bus interface.

7. Conveyor arrangement according to claim 1, characterized in that the sensor is designed to detect a conveyed material conveyed by the conveyor roller and to generate a sensor signal that signals the presence or the absence of a conveyed material in a sensor area monitored by the sensor.

8. Conveyor arrangement according to claim 1, characterized in that the electronic addressing module is formed on the sensor and has an addressing module bus data interface for connecting the bus line, wherein the electronic addressing module is designed to transmit the digital-sensor-signal data block to the bus line via the addressing module bus data interface.

9. Motor-operated conveyor roller for a conveyor arrangement according to claim 1, comprising:

a roller body rotatably mounted about a roller axle, a drive unit, arranged inside the roller body, that is mechanically coupled to the roller body and an axle element and is designed to generate a torque between the axle element and the roller body, a control data interface connected to the drive unit for signal transmission purposes, a control unit, comprising a control data bus interface, which is designed to be connected to a data bus line, wherein the control unit is signal-connected to the drive unit and is designed to receive bus-encoded data signals via the control data bus interface, to generate a control signal on the basis of the received data signals and to actuate the drive unit with a characteristic predetermined by the control signal by virtue of the control signal being transmitted to the drive unit, characterized in that the control unit is arranged in the roller body and designed to receive a bus-encoded sensor signal via the control data bus interface.

10. Motor-operated conveyor roller according to claim 9, characterized in that the control unit comprises a sensor data interface and an electronic addressing module that is couplable to a sensor and to the bus line via the sensor data interface for signal transmission purposes and is designed to encode a sensor signal received in the addressing module via the sensor data interface to form a bus-encoded sensor data block that comprises a digital digital-sensor-signal data block, characterizing the sensor signal, and a sensor address data block, and to transmit the bus-encoded sensor data block to the bus line.

11. Motor-operated conveyor roller according to claim 9, characterized in that the control unit is designed to generate the control signal on the basis of the bus-encoded sensor data block.

12. Method for operating a motor-operated conveyor roller for conveying items along multiple conveyor zones of a conveyor section, having the steps of:

detecting an item with a sensor in one of the conveyor zones, generating a digital-sensor-signal data block, which describes the detection of the item, and a sensor address data block, which describes the conveyor zone in which the item is detected, merging the digital-sensor-signal data block and the sensor address data block to form a bus-encoded digital-sensor-signal data block, sending the digital-sensor-signal data block via a bus line, receiving the digital-sensor-signal data block in a control unit, generating a control signal on the basis of the digital-sensor-signal data block, and actuating a drive unit in the conveyor roller with the control signal.

13. Method according to claim 12, characterized in that the control unit receives a sensor signal and encodes the sensor signal into the digital-sensor-signal data block.

14. Method according to claim 12, characterized in that the control unit is arranged in the roller body and transmits the digital-sensor-signal data block to a bus line via a control data bus interface arranged on the conveyor roller.

15. Method according to claim 12, characterized in that the control proceeds such that the sensor is used to detect an identity coding assigned to the conveyed material or a conveyor destination assigned to the conveyed material and that the control unit takes the sensor signal containing the identity coding assigned to the conveyed material or the conveyor destination assigned to the conveyed material as a basis for generating a control signal and transmits said control signal to an actuator on a divert, crossing or merge conveyor element that controls the actuator such that conveyance in a direction that can be derived from the identity coding or the conveyor destination and is necessary therefor or preferred is brought about.

* * * * *